(12) United States Patent
Jing et al.

(10) Patent No.: US 12,280,761 B2
(45) Date of Patent: Apr. 22, 2025

(54) METHOD AND DEVICE FOR CONTROLLING ENGINE TO SHUT DOWN, AND ELECTRONIC DEVICE AND STORAGE MEDIUM

(71) Applicants: NINGBO GEELY ROYAL ENGINE COMPONENTS CO., LTD., Ningbo (CN); Aurobay Technology Co., Ltd., Zhejiang (CN); ZHEJIANG GEELY HOLDING GROUP CO., LTD., Zhejiang (CN)

(72) Inventors: Junchao Jing, Ningbo (CN); Yiqiang Liu, Ningbo (CN); Weishan Huang, Ningbo (CN); Botao Zuo, Ningbo (CN); Xuemei Yu, Ningbo (CN); Ruiping Wang, Ningbo (CN); Ingo Scholten, Ningbo (CN)

(73) Assignees: NINGBO GEELY ROYAL ENGINE COMPONENTS CO., LTD., Ningbo (CN); Aurobay Technology Co., Ltd., Zhejiang (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 2 days.

(21) Appl. No.: 18/280,681

(22) PCT Filed: Jun. 29, 2021

(86) PCT No.: PCT/CN2021/103064
§ 371 (c)(1),
(2) Date: Sep. 7, 2023

(87) PCT Pub. No.: WO2023/272481
PCT Pub. Date: Jan. 5, 2023

(65) Prior Publication Data
US 2024/0157929 A1 May 16, 2024

(51) Int. Cl.
*B60W 10/06* (2006.01)
*F02D 41/04* (2006.01)

(52) U.S. Cl.
CPC .......... *B60W 10/06* (2013.01); *F02D 41/042* (2013.01); *B60W 2520/28* (2013.01)

(58) Field of Classification Search
CPC ............ B60W 10/06; B60W 2520/28; B60W 2710/0644; B60W 2710/0666;
(Continued)

(56) References Cited

U.S. PATENT DOCUMENTS

| 8,515,608 B2 | 8/2013 | Yamagata |
| 9,238,458 B2 | 1/2016 | Okubo et al. |

(Continued)

FOREIGN PATENT DOCUMENTS

| CN | 105620299 A | 6/2016 |
| CN | 105774571 A | 7/2016 |

(Continued)

OTHER PUBLICATIONS

Machine Translation of CN106285972A Pdf File Name: "CN106285972A_Machine_Translation.pdf".*

(Continued)

*Primary Examiner* — Grant Moubry
*Assistant Examiner* — Ruben Picon-Feliciano
(74) *Attorney, Agent, or Firm* — Ling Wu; Stephen Yang; Ling and Yang Intellectual Property (57) ABSTRACT

A method and a device for controlling an engine to shut down, and an electronic device and a storage medium are provided. The method includes: obtaining current state information and operating parameter information of an engine, the current state information comprising a starting state, and the operating parameter information comprising rotating speed information, starting duration information, (Continued)

cooling liquid temperature information and torque information of the engine; and if the current state information is the starting state, and the rotating speed information, the starting duration information, the cooling liquid temperature information, and the torque information satisfy a first preset shutdown condition corresponding to the starting state, controlling the engine to be in a shutdown state.

14 Claims, 3 Drawing Sheets

(58) Field of Classification Search
CPC ......... B60W 2710/0688; B60W 10/02; B60W 10/08; B60W 20/15; B60W 20/40; B60W 20/50; B60W 30/192; B60W 30/194; B60W 20/00; B60W 2510/06; B60W 2510/0638; B60W 2510/0657; B60W 2520/10; F02D 41/042; F02D 2200/02; F02D 2200/1002; F02D 2200/101; Y02T 10/62; B60K 6/442
See application file for complete search history.

(56) References Cited

U.S. PATENT DOCUMENTS

| | | | |
|---|---|---|---|
| 2015/0291150 A1 | 10/2015 | Sujan et al. | |
| 2018/0066622 A1 | 3/2018 | Jeong | |
| 2020/0263621 A1 | 8/2020 | Khafagy et al. | |

FOREIGN PATENT DOCUMENTS

| | | | | |
|---|---|---|---|---|
| CN | 106285972 A | * | 1/2017 | |
| CN | 106809206 A | | 6/2017 | |
| CN | 109572666 A | | 4/2019 | |
| CN | 112590755 A | | 4/2021 | |
| CN | 112677953 A | | 4/2021 | |
| FR | 3006384 A1 | | 12/2014 | |
| FR | 3087175 A1 | | 4/2020 | |

OTHER PUBLICATIONS

European Search Report for 21854733.9 Mailed Oct. 4, 2022.
International Search Report for PCT/CN2021/103064 Mailed Mar. 3, 2022.

* cited by examiner

| Acquiring current state information and operation parameter information of an engine, wherein the current state information includes a starting state, and the operation parameter information includes revolution speed information, start duration information, coolant temperature information and torque information of the engine | S401 |

| Controlling the engine to be in the stopped state if the current state information is the starting state, and the revolution speed information, the start duration information, the coolant temperature information and the torque information meet a first preset stop condition corresponding to the starting state | S403 |

METHOD AND DEVICE FOR CONTROLLING ENGINE TO SHUT DOWN, AND ELECTRONIC DEVICE AND STORAGE MEDIUM

CROSS-REFERENCE TO RELATED APPLICATION

The present application is a U.S. National Phase Entry of International Application PCT/CN2021/103064 having an international filing date of Jun. 29, 2021 and entitled "Method and Apparatus for Controlling Engine to Shut Down, and Electronic Device and Storage Medium", and the contents disclosed in the above-mentioned application are incorporated herein by reference.

TECHNICAL FIELD

The present disclosure relates to the technical field of engine control, particularly relates to a method, a device, an electronic device and a storage medium for controlling engine to shut down.

BACKGROUND

Figure 1:
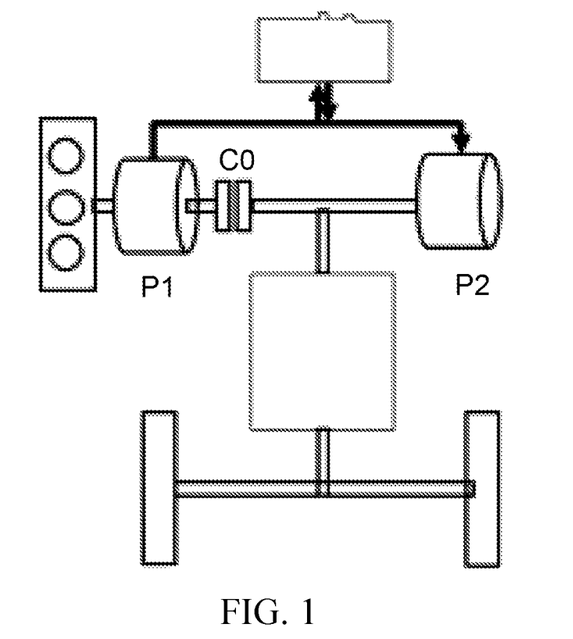
FIG. 1 is a schematic structural diagram of an existing dual-motor hybrid power system.

In response to the call of the national policies on energy saving and emission reduction, original equipment manufacturers (OEMs) and parts suppliers are committed to strictly controlling fuel consumption and emissions of automobiles. With booming development of electrification system, pure electric vehicles and hybrid electric vehicles have come into public view. However, because of high manufacturing costs of pure electric vehicles, they cannot be promoted vigorously. Therefore, hybrid electric vehicles have become a main force for energy saving and emission reduction. FIG. 1 is a schematic structural diagram of an existing dual-motor hybrid system, in which the motors have three modes: a pure electric mode, a series mode and a parallel mode. In the series mode, a clutch C0 is not engaged, an engine charges a battery through a P1 motor, and a P2 motor drives wheels. In the parallel mode, the clutch C0 is engaged, and the engine directly drives the wheels.

Based on the structure shown in FIG. 1, the dual-motor hybrid system has three starting modes, that is, 12V starting, P1 motor starting and clutch starting. Under normal circumstances, the dual-motor hybrid system uses the P1 motor to start the engine. If the P1 motor fails and a vehicle speed is less than 10 km/h, the engine may be started by the 12V. If the P1 motor fails and the vehicle speed is more than 10 km/h, the engine may be started by the clutch. In starting processes of the three starting modes, if the starting time is excessively long, an engine revolution speed is always below a set threshold, which causes the vehicle to be in the starting state all the time, or a situation of continuous flameout and switching starting, which will lead to damages of the equipment, such as engine, a dual-mass flywheel.

SUMMARY

Embodiments of the present application provide a method, a device, an electronic equipment and a storage medium for controlling engine stop, which can avoid damages of hardware equipment such as a starting motor and a dual-mass flywheel and the like, and improve safety and reliability of a system.

An embodiment of the present application provides a method for controlling engine to shut down, and the method includes:
acquiring current state information and operation parameter information of an engine, wherein the current state information includes a starting state, and the operation parameter information includes revolution speed information, start duration information, coolant temperature information and torque information of the engine; and
controlling the engine to be in a shutdown state if the current state information is the starting state, and the revolution speed information, the start duration information, the coolant temperature information and the torque information meet a first preset stop condition corresponding to the starting state.

Furthermore, the current state information also includes an operating state; the method further includes: controlling the engine to be in the shutdown state if the current state information is the operating state, and the revolution speed information meets a second preset stop condition corresponding to the operating state.

Furthermore, the current state information further includes the shutdown state, and the operation parameter information further includes engine-restart number information, stop duration information, vehicle speed information and safety equipment working information; the method further includes: controlling the engine to be in the shutdown state if the current state is the shutdown state, and the restart number information, the stop duration information, the vehicle speed information and the safety equipment working information meet a third preset stop condition corresponding to the shutdown state.

Furthermore, the starting state includes states corresponding to starting based on multiple starting modes, and the starting modes include a 12V starting mode, a first motor starting mode and a clutch starting mode; and the first preset stop condition includes a first sub-condition corresponding to the 12V starting mode, a second sub-condition corresponding to the first motor starting mode and a third sub-condition corresponding to the clutch starting mode.

Furthermore, controlling the engine to be in the shutdown state if the current state information is the starting state, and the revolution speed information, the start duration information, the coolant temperature information and the torque information meet the first preset stop condition corresponding to the starting state includes: controlling the engine to be in the shutdown state if the starting state is a state corresponding to starting based on the 12V starting mode, and the revolution speed information, the start duration information, the coolant temperature information and the torque information meet the first sub-condition.

Furthermore, controlling the engine to be in the shutdown state if the current state information is the starting state, and the revolution speed information, the start duration information, the coolant temperature information and the torque information meet the first preset stop condition corresponding to the starting state includes: controlling the engine to be in the shutdown state if the starting state is a state corresponding to starting based on the first motor starting mode, and the revolution speed information, the start duration information, the coolant temperature information and the torque information meet the second sub-condition.

Furthermore, controlling the engine to be in the shutdown state if the current state information is the starting state, and the revolution speed information, the start duration information, the coolant temperature information and the torque information meet the first preset stop condition corresponding to the starting state includes: controlling the engine to be in the shutdown state if the starting state is a state corresponding to starting based on the clutch starting mode, and the revolution speed information, the start duration information, the coolant temperature information and the torque information meet the third sub-condition.

Accordingly, an embodiment of the present application further provides a device for controlling engine to shut down, which includes:

an acquisition module, configured to acquire current state information and operation parameter information of an engine, wherein the current state information includes a starting state, and the operation parameter information includes revolution speed information, start duration information, coolant temperature information and torque information of the engine; and a control module, configured to control the engine to be in a shutdown state if the current state information is the starting state, and the revolution speed information, the start duration information, the coolant temperature information and the torque information meet a first preset stop condition corresponding to the starting state.

Furthermore, the current state information further includes an operating state; and the control module is configured to control the engine to be in the shutdown state if the current state information is the operating state and the revolution speed information meets a second preset stop condition corresponding to the operating state.

Furthermore, the current state information further includes the shutdown state, and the operation parameter information further includes engine-restart number information, stop duration information, vehicle speed information and safety equipment working information; and the control module is configured to control the engine to be in the shutdown state if the current state is the shutdown state, and the restart number information, the stop duration information, the vehicle speed information and the safety equipment working information meet a third preset stop condition corresponding to the shutdown state.

Furthermore, the starting state includes states corresponding to starting based on multiple starting modes, which include a 12V starting mode, a first motor starting mode and a clutch starting mode; the first preset stop condition includes a first sub-condition corresponding to the 12V starting mode, a second sub-condition corresponding to the first motor starting mode and a third sub-condition corresponding to the clutch starting mode.

Furthermore, the control module is configured to control the engine to be in the shutdown state if the starting state is the state corresponding to starting based on the 12V starting mode, and the revolution speed information, the start duration information, the coolant temperature information and the torque information meet the first sub-condition.

Furthermore, the control module is configured to control the engine to be in the shutdown state if the starting state is the state corresponding to starting based on the first motor starting mode, and the revolution speed information, the start duration information, the coolant temperature information and the torque information meet the second sub-condition.

Furthermore, the control module is configured to control the engine to be in the shutdown state if the starting state is the state corresponding to starting based on the clutch starting mode, and the revolution speed information, the start duration information, the coolant temperature information and the torque information meet the third sub-condition.

Accordingly, an embodiment of the present application further provides an electronic equipment, which includes a processor and a memory, wherein at least one instruction, at least one program, a code set or an instruction set is stored in the memory, and the at least one instruction, the at least one program, the code set or the instruction set is loaded and executed by the processor to implement the method for controlling engine to shut down as described above.

Accordingly, an embodiment of the present application further provides a computer-readable storage medium in which at least one instruction, at least one program, a code set or an instruction set is stored, and the at least one instruction, the at least one program, the code set or the instruction set is loaded and executed by a processor to implement the method for controlling the engine to shut down as described above.

The embodiments of the present application bring about the following beneficial effects:

the embodiments of the present application disclose the method, the device, the electronic equipment and the storage medium for controlling engine to shut down, wherein the method includes acquiring the current state information and the operation parameter information of the engine, the current state information includes the starting state, and the operation parameter information includes the revolution speed information, the start duration information, the coolant temperature information and the torque information of the engine. If the current state information is the starting state, and the revolution speed information, the start duration information, the coolant temperature information and the torque information meet the first preset stop condition corresponding to the starting state, the engine is controlled to be in the shutdown state. Based on the embodiments of the present application, excessively long starting time and excessively low revolution speed of the engine can be prevented, the damages of the hardware equipment such as the starting motor and the dual-mass flywheel can be avoided, and the safety and the reliability of the system can be improved.

BRIEF DESCRIPTION OF DRAWINGS

In order to more clearly explain technical solutions and advantages of embodiments of the present application or in the prior art, the drawings that is needed to be used in the description of the embodiments or the in prior art will be briefly introduced in the following. Apparently, the drawings in the following description are only some embodiments of the present application, and for those of ordinary skills in the art, other drawings may be obtained according to these drawings without creative efforts.

DETAILED DESCRIPTION

In order to make purposes, technical solutions and advantages of the present application clearer, the embodiments of the present application will be further described in detail below with reference to accompanying drawings. Apparently, an embodiment described is only one embodiment of the present application, not all of the embodiments. Based on the embodiments of the present application, all other embodiments obtained by those of ordinary skills in the art without creative efforts are within the scope of protection of the present application.

The "embodiment" as used herein refers to specific features, the structures or the characteristics that may be included in at least one implementation of the present application. In the description of the embodiments of the present application, it should be understood that the terms "first", "second" and "third" are only used for descriptive purposes, and cannot be understood as indicating or implying relative importance or implicitly indicating the number of indicated technical features. Thus, the features defined with "first", "second" and "third" may explicitly or implicitly include one or more of the features. Moreover, the terms "first", "second", "third" and the like are used to distinguish similar objects, but not necessarily to describe a specific order or a sequence. It should be understood that data used in this way is interchangeable under appropriate circumstances, so that the embodiments of the present application described herein may be implemented in an order other than that illustrated or described herein. Additionally, the terms "including" and "being" and any variations thereof are intended to cover non-exclusive inclusion.

Figure 2:
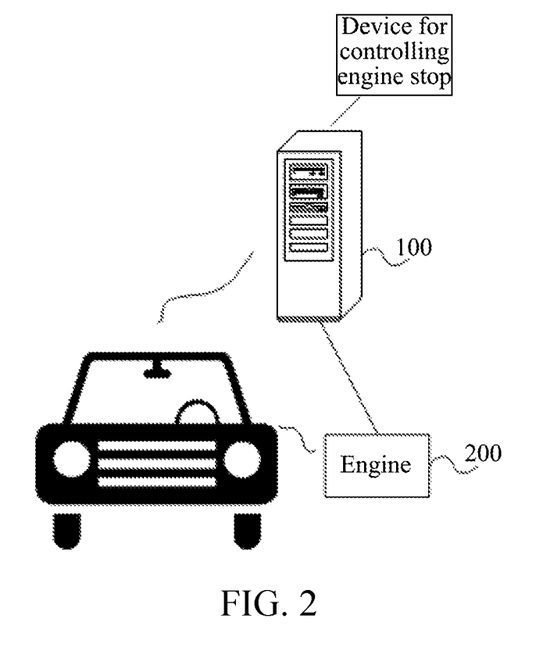
FIG. 2 is a schematic diagram of an application environment according to an embodiment of the present application.

Referring to FIG. 2, it shows a schematic diagram of an application environment according to an embodiment of the present application, which includes a server 100 and an engine 200, wherein the server 100 may obtain current state information and operation parameter information of the engine 200, and control the engine 200 to be in a shutdown state according to the current state information and the operation parameter information of the engine 200. If the current state information of the engine 200 is a starting state, and revolution speed information, start duration information, coolant temperature information and torque information meet a first preset stop condition corresponding to the starting state, the engine 200 is controlled to be in the shutdown state. If the current state information of the engine 200 is an operating state, and the revolution speed information meets a second preset stop condition corresponding to the operating state, the engine 200 is controlled to be in the shutdown state. If the current state of the engine 200 is the shutdown state, and restart number information, stop duration information, vehicle speed information and safety equipment working information meet a third preset stop condition corresponding to the shutdown state, the engine 200 is controlled to be in the shutdown state.

Figure 3:
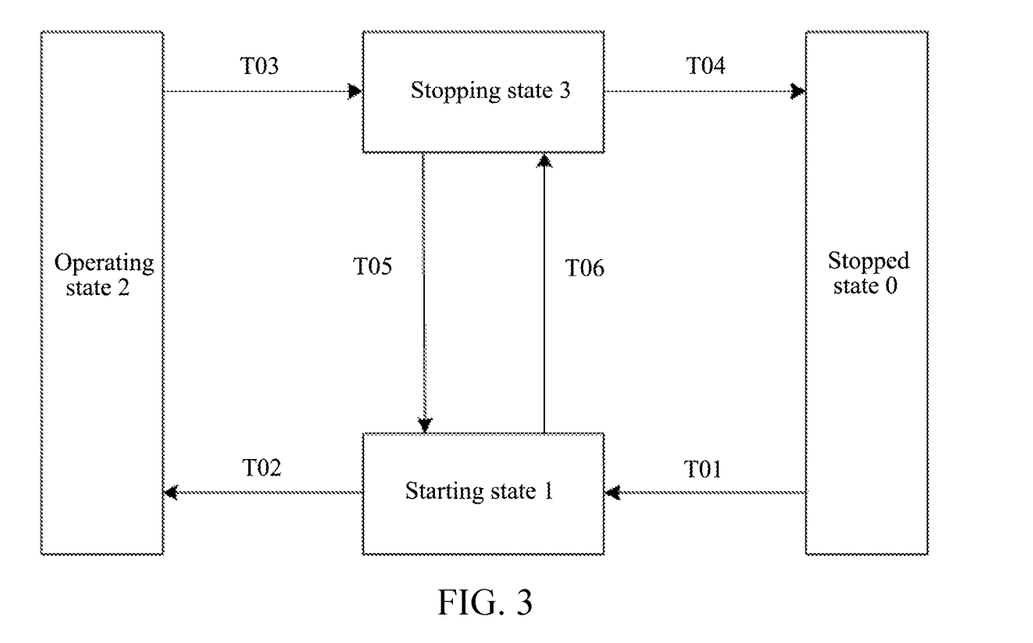
FIG. 3 is a schematic structural diagram of a method for switching current state information for an engine according to an embodiment of the present application.

FIG. 3 is a schematic structural diagram of a method for switching current state information for an engine according to an embodiment of the present application.

In the embodiment of the present application, the current state information of the engine may include a shutdown state 0, a starting state 1, an operating state 2 and a stopping state 3.

If a historical state of the engine is the shutdown state 0, and a server receives an engine start request, i.e., T01, it may be determined that the engine is in the starting state 1.

If the historical state of the engine is the starting state 1, and in starting information received by the server, the engine is started by cold starting or 12V starting, and an engine revolution speed is larger than 800 r/s for over 0.3 s and a current fuel cut-off coefficient is below 0.9, i.e., T02, it may be determined that the engine is in the operating state 2.

If the historical state of the engine is the starting state 1, and in starting information received by the server, the engine is started by warm-up starting, the first motor starting or the clutch starting, and the engine revolution speed is greater than 600 r/s for over 0.04 s and the current fuel cut-off coefficient is below 0.9, i.e., T02, it may be determined that the engine is in the operating state 2.

If the historical state of the engine is the starting state 1 and the server has not received the engine start request, i.e., T06, it may be determined that the engine is in the stopping state 3.

If the historical state of the engine is the operating state 2 and the server has not received the engine start request, i.e., T03, it may be determined that the engine is in the stopping state 3.

If the historical state information of the engine is the stopping state 3, and in the starting information received by the server, the engine revolution speed is less than 100 r/s for over 0.1 s, i.e., T04, it may be determined that the engine is in the shutdown state 0.

If the historical state information of the engine is the stopping state 3, and the server receives the engine start request, i.e., T05, it may be determined that the engine is in the starting state 1.

In an embodiment of the present application, the server may control the engine to be in the shutdown state in a case of warm-up starting and that a coolant temperature is higher than 80° C. for over 2.5 s without switching to the operating state. The server may control the engine to be in the shutdown state in a case of cold starting and that the coolant temperature is lower than 80° C. for over 4 s without switching to the operating state.

Figure 4:
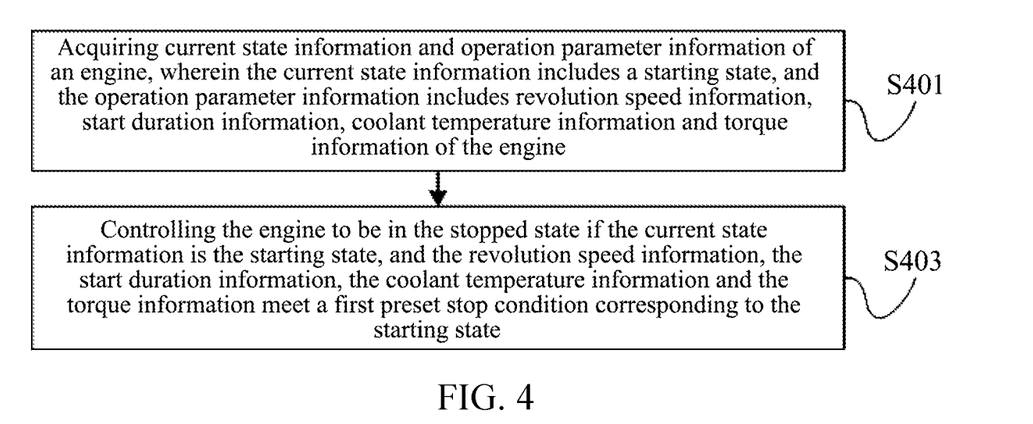
FIG. 4 is a schematic flow diagram of a method for controlling engine to shut down according to an embodiment of the present application.

Next, a specific embodiment of a method for controlling engine to shut down in the present application will be introduced. FIG. 4 is a schematic flow diagram of a method for controlling engine to shut down according to an embodiment of the present application. This description provides operation steps of the method as shown in the embodiment or the flow diagram, but more or fewer operation steps may be included based on conventional or uncreative work. The order of steps listed in the embodiment is only one of multiple execution orders, and does not represent a unique execution order. In actual execution, they may be executed sequentially or in parallel (for example, in parallel processor or multi-threading processing environment) according to the method shown in the embodiment or drawing. The details are shown in FIG. 4, and the method includes:

S401: acquiring current state information and operation parameter information of an engine, wherein the current state information includes a starting state, and the operation parameter information includes revolution speed information, start duration information, coolant temperature information and torque information of the engine.

S403: controlling the engine to be in the shutdown state if the current state information is the starting state, and the revolution speed information, the start duration information, the coolant temperature information and the torque information meet a first preset stop condition corresponding to the starting state.

In an embodiment of the present application, the starting state may include states corresponding to starting based on multiple starting modes, wherein the starting modes may include a 12V starting mode, a first motor starting mode and a clutch starting mode.

In an embodiment of the present application, if the starting state is the state corresponding to starting based on the 12V starting mode, and the revolution speed information, the start duration information, the coolant temperature information and the torque information meet a first sub-condition, the engine is controlled to be in the shutdown state.

In an optional embodiment, the first sub-condition may be that a revolution speed in the revolution speed information of the engine is less than a set first revolution speed threshold, and duration in the start duration information exceeds a corresponding duration threshold. The corresponding duration threshold may have a corresponding relationship with the start duration information and the coolant temperature information, which is as shown in Table 1.

TABLE 1

| | X | | | |
|---|---|---|---|---|
| Y | −40 | −20 | 50 | 100 |
| 0 | −10 | −10 | −10 | −10 |
| 1 | −10 | −10 | −10 | −10 |
| 2.4 | −10 | −10 | −10 | −10 |
| 2.5 | 100 | 100 | 100 | 100 |
| 9.5 | 100 | 100 | 100 | 100 |
| 10 | 350 | 350 | 350 | 350 |
| 29 | 350 | 350 | 350 | 350 |
| 30 | 650 | 650 | 650 | 650 |

X represents the coolant temperature information, and Y represents the start duration information.

Based on Table 1, it may be clearly known that in a starting process of 12V starting, in a case that the engine revolution speed is less than 320 r/s and the duration exceeds 10 s, it may be considered that the starting has failed.

In another optional embodiment, if the engine revolution speed is kept in a low revolution speed state, for example, at a low revolution speed of 100 r/s to 750 r/s for a certain time, a dual-mass flywheel will be damaged, and it is necessary to terminate this starting. Herein, the duration of the certain time may have a corresponding relationship with the revolution speed information and the vehicle speed information, which is as shown in Table 2.

TABLE 2

| | N | | | | |
|---|---|---|---|---|---|
| V | 100 | 144 | 250 | 700 | 750 |
| 10 | 0.380 | 0.380 | 0.380 | 0.380 | 0.384 |
| 12 | 0.380 | 0.380 | 0.380 | 0.300 | 0.330 |
| 115 | 0.360 | 0.360 | 0.360 | 0.330 | 0.360 |

N represents the revolution speed information, and V represents the vehicle speed information.

In another optional embodiment, for the first 12V starting, if the engine revolution speed is less than 50 r/s and the duration exceeds 2.5 s during the start, it may be considered that the engine has failed to start. For repeated 12V starting, if the engine revolution speed is less than 50 r/s and the duration exceeds 0.4 s during the start, it may be considered that the engine has failed to start.

In another optional embodiment, the first sub-condition may be that the duration in the start duration information of the engine exceeds a preset duration threshold. For example, if the duration of the 12V starting exceeds 30 s, it may be considered that the engine has failed to start.

In an embodiment of the present application, if the starting state is the state corresponding to starting based on the first motor starting mode, and the revolution speed information, the start duration information, the coolant temperature information and the torque information meet a second sub-condition, the engine is controlled to be in the shutdown state.

In an optional embodiment, the second sub-condition may be that the revolution speed in the revolution speed information of the engine is less than a set second revolution speed threshold, and the duration in the start duration information exceeds a corresponding duration threshold. For example, the engine revolution speed is less than 100 r/s, and the duration exceeds 1 s.

In another optional embodiment, the second sub-condition may be that during a cold starting, the duration in the start duration information exceeds a corresponding duration threshold, and during a warm-up starting the duration in the duration information exceeds a corresponding duration threshold. For example, during the cold starting, the duration exceeds 30 s, and during the warm-up starting, the duration exceeds 3 s.

In another optional embodiment, the second sub-condition may be that exit time of an integrated starter generator (ISG) path of an engine shutdown/start system exceeds 0.2 s during a starting process of the first motor, which may be caused by a failure of the first motor and/or the second motor, or the exit time of an ISG starting request exceeds 0.2 s during the starting process of the first motor, which may be caused by the failure of the first motor and/or the second motor, wherein the failure may be that the first motor is not in the torque mode, or its path is not a path of the first motor.

In an embodiment of the present application, if the starting state is the state corresponding to the starting based on the clutch starting mode, and the revolution speed information, the start duration information, the coolant temperature information and the torque information meet a third sub-condition, the engine is controlled to be in the shutdown state.

In an optional embodiment, the third sub-condition may be that when starting of the clutch completes, the revolution speed in the revolution speed information is less than a third revolution speed threshold, and the torque of clutch in the torque information is less than a corresponding torque threshold. For example, when the starting of the clutch completes, the engine revolution speed is less than 300 r/s and the torque of clutch is less than 1 Nm.

In another optional embodiment, the third sub-condition may be that the clutch is malfunctioning and unusable.

In another optional embodiment, the third sub-condition may be that the duration in the start duration information exceeds a corresponding duration threshold, and the torque in the torque information is less than a corresponding torque threshold. For example, duration of starting the clutch exceeds 3 s and the torque of clutch is less than 1 Nm.

In another optional embodiment, the third sub-condition may be that the revolution speed in the revolution speed information is less than a corresponding fourth revolution speed threshold, and the torque of clutch in the torque information is less than a corresponding torque threshold. For example, the engine revolution speed is less than 450 r/s and the torque of clutch is less than 1 Nm.

Figure 5:
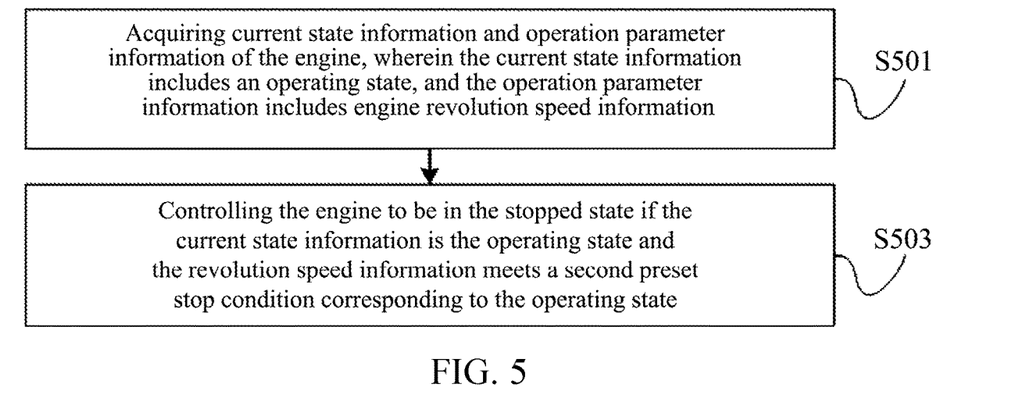
FIG. 5 is a schematic flow diagram of a method for controlling engine to shut down according to an embodiment of the present application.

Next, a specific embodiment of a method for controlling engine to shut down in the present application will be introduced. FIG. 5 is a schematic flow diagram of a method for controlling engine to shut down according to an embodiment of the present application. This description provides operation steps of the method as shown in the embodiment or flow diagram, but more or fewer operation steps may be included based on conventional or uncreative work. The order of steps listed in the embodiment is only one of multiple execution orders, and does not represent a unique execution order. In actual execution, they may be executed sequentially or in parallel (for example, in parallel processor or multi-threading processing environment) according to the method shown in the embodiment or drawing. The details are as shown in FIG. 5, and the method includes:

S501: acquiring the current state information and operation parameter information of an engine, wherein the current state information includes an operating state, and the operation parameter information includes revolution speed information of the engine.

S503: controlling the engine to be in the shutdown state if the current state information is the operating state and the revolution speed information meets a second preset stop condition corresponding to the operating state.

In an embodiment of the present application, the second preset stop condition may be that the engine revolution speed is lower than a preset revolution speed threshold when the engine is in a normal operating state.

In a specific embodiment, when the engine is in the normal operating state and the engine revolution speed drops below 10 r/s, the engine is controlled to be in the shutdown state.

Figure 6:
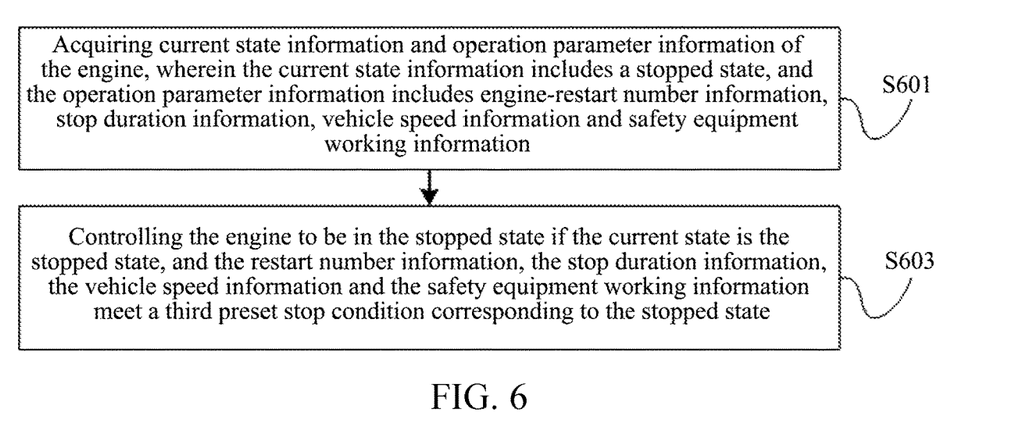
FIG. 6 is a schematic flow diagram of a method for controlling engine to shut down according to an embodiment of the present application.

Next, a specific embodiment of a method for controlling engine to shut down in the present application will be introduced. FIG. 6 is a schematic flow diagram of a method for controlling engine to shut down according to an embodiment of the present application. This description provides operation steps of the method as shown in the embodiment or the flow diagram, but more or fewer operation steps may be included based on conventional or uncreative work. The order of steps listed in the embodiment is only one of multiple execution orders, and does not represent a unique execution order. In actual execution, they may be executed sequentially or in parallel (for example, in parallel processor or multi-threading processing environment) according to the method shown in the embodiment or drawing. The details are as shown in FIG. 6, and the method includes:

S601: acquiring current state information and operation parameter information of an engine, wherein the current state information includes a shutdown state, and the operation parameter information includes the engine-restart number information, stop duration information, vehicle speed information and safety equipment working information;

S603: if the current state is the shutdown state, and the restart number information, the stop duration information, the vehicle speed information and the safety equipment working information meet a third preset stop condition corresponding to the shutdown state, the engine is controlled to be in the shutdown state.

In an embodiment of the present application, when the engine is in the shutdown state, if the third preset stop condition is met, that is, the engine enters low battery Power Down, it is no longer allowed to automatically start the engine, but may only be manually started by a driver. Herein, the third preset condition may include the following:
① the restart number in the restart number information exceeds 3;
② the stop duration in the stop duration information exceeds 10 s;
③ when the engine is in the shutdown state, a vehicle speed in the vehicle speed information is larger than 10 km/h;
④ in the safety equipment working information, the seatbelt is not worn by the driver.

If the third preset stop condition is not met, and the engine does not enter low battery Power Down, and the engine revolution speed is less than 50 r/s, it is allowed to automatically start the engine without manually turning a key by the driver to restart the engine.

By the method for controlling engine to shut down according to the embodiment of the present application, excessively long starting time and excessively low revolution speed of the engine can be prevented, damages of hardware equipment such as the starting motor and the dual-mass flywheel can be avoided, and the safety and the reliability of the system can be improved.

Figure 7:
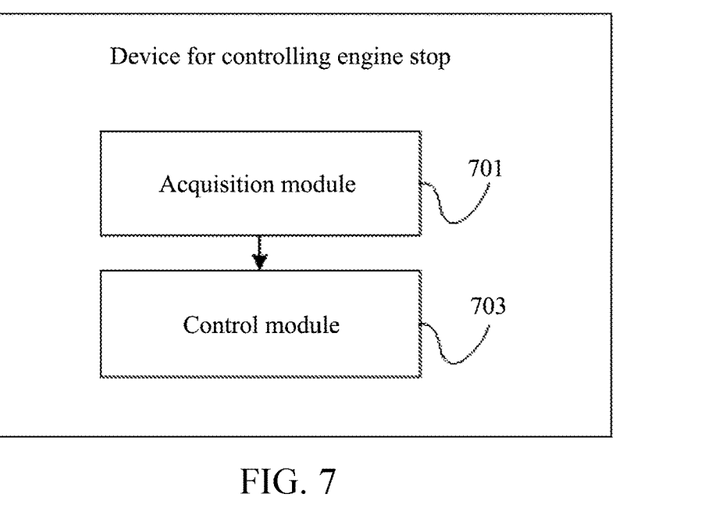
FIG. 7 is a schematic structural diagram of a device for controlling engine to shut down according to an embodiment of the present application.

An embodiment of the present application further provides a device for controlling engine to shut down. FIG. 7 is a schematic structural diagram of a device for controlling engine to shut down according to an embodiment of the present application. As shown in FIG. 7, the device may include:

an acquisition module 701, configured to acquire current state information and operation parameter information of an engine, wherein the current state information includes a starting state, and the operation parameter information includes revolution speed information, start duration information, coolant temperature information and torque information of the engine.

a control module 703, configured to control the engine to be in the shutdown state if the current state information is the starting state, and the revolution speed information, the start duration information, the coolant temperature information and the torque information meet a first preset stop condition corresponding to the starting state.

In an embodiment of the present application, the current state information further includes an operating state.

The control module is configured to control the engine to be in the shutdown state if the current state information is the operating state and the revolution speed information meets a second preset stop condition corresponding to the operating state.

In an embodiment of the present application, the current state information further includes a shutdown state, and the operation parameter information further includes engine-restart number information, stop duration information, vehicle speed information and safety equipment working information.

The control module is configured to control the engine to be in the shutdown state if the current state is the shutdown state, and the restart number information, the stop duration information, the vehicle speed information and the safety equipment working information meet a third preset stop condition corresponding to the shutdown state.

In an embodiment of the present application, the starting state includes states corresponding to starting based on multiple starting modes, which include a 12V starting mode, a first motor starting mode and a clutch starting mode.

The first preset stop condition includes a first sub-condition corresponding to the 12V starting mode, a second sub-condition corresponding to the first motor starting mode and a third sub-condition corresponding to the clutch starting mode.

In an embodiment of the present application, the control module is configured to control the engine to be in the shutdown state if the starting state is the state corresponding to starting based on the 12V starting mode, and the revolution speed information, the start duration information, the coolant temperature information and the torque information meet the first sub-condition.

In an embodiment of the present application, the control module is configured to control the engine to be in the shutdown state if the starting state is the state corresponding to starting based on the first motor starting mode, and the revolution speed information, the start duration information, the coolant temperature information and the torque information meet the second sub-condition.

In an embodiment of the present application, the control module is configured to control the engine to be in the shutdown state if the starting state is the state corresponding to starting based on the clutch starting mode, and the revolution speed information, the start duration information, the coolant temperature information and the torque information meet the third sub-condition.

The device and method embodiments in the embodiments of the present application are based on the same application concept.

By the device for controlling engine to shut down according to the embodiment of the present application, excessively long starting time and excessively low revolution speed of the engine can be prevented, the damage of hardware equipment such as the starting motor and the dual-mass flywheel can be avoided, and the safety and the reliability of the system can be improved.

An embodiment of the present application further provides an electronic equipment, which may be set in the controller to save at least one instruction, at least one program, a code set or an instruction set related to implementation of a method for controlling engine to shut down in a method embodiment, wherein the at least one instruction, the at least one program, the code set or the instruction set are loaded and executed by a memory to implement the above method for controlling engine to shut down.

An embodiment of the present application further provides a storage medium, which may be set in the server to save at least one instruction, at least one program, a code set or an instruction set related to implementation of a method for controlling engine to shut down in a method embodiment, wherein the at least one instruction, the at least one program, the code set or the instruction set are loaded and executed by a processor to implement the above method for controlling engine to shut down.

Optionally, in this embodiment, the storage medium may be located at least one of multiple network servers of a computer network. Optionally, in this embodiment, the storage medium may include, but are not limited to, various mediums capable of storing program codes, such as U Disk, Read-only Memory (ROM), mobile hard disk, magnetic disk or optical disk.

It may be seen from the above embodiments of the method, the device, the electronic equipment or the storage medium for controlling engine to shut down according to present application that, the method in the present application includes acquiring current state information and operation parameter information of an engine, wherein the current state information includes a starting state, and the operation parameter information includes revolution speed information, start duration information, coolant temperature information and torque information of the engine. If the current state information is the starting state, and the revolution speed information, the start duration information, the coolant temperature information and the torque information meet a first preset stop condition corresponding to the starting state, the engine is controlled to be in the shutdown state. Based on the embodiments of the present application, excessively long starting time and excessively low revolution speed of the engine can be prevented, damages of hardware equipment such as the starting motor and the dual-mass flywheel can be avoided, and the safety and the reliability of the system can be improved.

It is to be noted that the order of the embodiments of the present application described above is only for description, and does not represent advantages and disadvantages of the embodiments. Moreover, specific embodiments are described in the specification, and other embodiments are within the scope of the appended claims. In some cases, the actions or steps described in the claims may be executed in the order of different embodiments and can achieve the desired results. Additionally, the process depicted in the drawings does not necessarily require a specific order or a connection order to achieve the desired results. In some embodiments, multi-task parallel processing is also possible or may be advantageous.

The embodiments in this description are described in a progressive way, and the same and similar parts between the embodiments may be referred to each other. The contents on which each embodiment focuses are differences compared with other embodiments. Particularly, for the embodiment of the device, because it is based on similarities with the method embodiment, the description is relatively simple. For relevant contents, reference may be made to the partial description of the method embodiment.

The above is preferred embodiments of the present disclosure, and it is to be indicated that for those of ordinary skills in the art, various improvements and modifications may be made without departing from the principle of the present disclosure, which are also regarded as being within the protection scope of the present disclosure.

The invention claimed is:

1. A method for controlling an engine to shut down, comprising:
   acquiring current state information and operation parameter information of the engine, wherein the current state information comprises a starting state and a shutdown state, and the operation parameter information comprises revolution speed information, start duration information, coolant temperature information, torque information of the engine, engine-restart number information, stop duration information, vehicle speed information and safety equipment working information;
   controlling the engine to be in a shutdown state if the current state information is the starting state, and the revolution speed information, the start duration information, the coolant temperature information and the torque information meet a first preset stop condition corresponding to the starting state; and
   controlling the engine to be in the shutdown state if the current state is the shutdown state, and the engine-restart number information, the stop duration information, the vehicle speed information and the safety equipment working information meet a third preset stop condition corresponding to the shutdown state.

2. The method according to claim 1, wherein the current state information further comprises an operating state;
the method further comprises:
controlling the engine to be in the shutdown state if the current state information is the operating state, and the revolution speed information meets a second preset stop condition corresponding to the operating state.

3. The method according to claim 1, wherein the starting state comprises states corresponding to starting based on a plurality of starting modes, which comprise a 12V starting mode, a first motor starting mode and a clutch starting mode;
the first preset stop condition comprises a first sub-condition corresponding to the 12V starting mode, a second sub-condition corresponding to the first motor starting mode and a third sub-condition corresponding to the clutch starting mode.

4. The method according to claim 3, wherein controlling the engine to be in the shutdown state if the current state information is the starting state, and the revolution speed information, the start duration information, the coolant temperature information and the torque information meet the first preset stop condition corresponding to the starting state comprises:
controlling the engine to be in the shutdown state if the starting state is a state corresponding to starting based on the 12V starting mode, and the revolution speed information, the start duration information, the coolant temperature information and the torque information meet the first sub-condition.

5. The method according to claim 3, wherein controlling the engine to be in the shutdown state if the current state information is the starting state, and the revolution speed information, the start duration information, the coolant temperature information and the torque information meet the first preset stop condition corresponding to the starting state comprises:
controlling the engine to be in the shutdown state if the starting state is a state corresponding to starting based on the first motor starting mode, and the revolution speed information, the start duration information, the coolant temperature information and the torque information meet the second sub-condition.

6. The method according to claim 1, wherein controlling the engine to be in the shutdown state if the current state information is the starting state, and the revolution speed information, the start duration information, the coolant temperature information and the torque information meet the first preset stop condition corresponding to the starting state comprises:
controlling the engine to be in the shutdown state if the starting state is a state corresponding to starting based on the clutch starting mode, and the revolution speed information, the start duration information, the coolant temperature information and the torque information meet the third sub-condition.

7. An electronic equipment comprising a processor and a memory, wherein at least one instruction, at least one program, a code set or an instruction set is stored in the memory, and the at least one instruction, the at least one program, the code set or the instruction set is loaded and executed by the processor to implement the method for controlling engine to shut down according to claim 1.

8. A non-transitory computer-readable storage medium, wherein at least one instruction, at least one program, a code set or an instruction set is stored in the storage medium, and the at least one instruction, the at least one program, the code set or the instruction set is loaded and executed by a processor to implement the method for controlling engine to shut down according to claim 1.

9. A device for controlling an engine to shut down, comprising a processor configured to:
acquire current state information and operation parameter information of the engine, wherein the current state information comprises a starting state and a shutdown state, and the operation parameter information comprises revolution speed information, start duration information, coolant temperature information, torque information of the engine, engine-restart number information, stop duration information, vehicle speed information and safety equipment working information;
control the engine to be in a shutdown state if the current state information is the starting state, and the revolution speed information, the start duration information, the coolant temperature information and the torque information meet a first preset stop condition corresponding to the starting state; and
control the engine to be in the shutdown state if the current state is the shutdown state, and the engine-restart number information, the stop duration information, the vehicle speed information and the safety equipment working information meet a third preset stop condition corresponding to the shutdown state.

10. The device for controlling engine to shut down according to claim 9, wherein the current state information further comprises an operating state; and the processor is configured to control the engine to be in the shutdown state if the current state information is the operating state and the revolution speed information meets a second preset stop condition corresponding to the operating state.

11. The device for controlling engine to shut down according to claim 9, wherein the starting state comprises states corresponding to starting based on a plurality of starting modes, which comprise a 12V starting mode, a first motor starting mode and a clutch starting mode;
the first preset stop condition comprises a first sub-condition corresponding to the 12V starting mode, a second sub-condition corresponding to the first motor starting mode and a third sub-condition corresponding to the clutch starting mode.

12. The device for controlling engine to shut down according to claim 11, wherein the processor is configured to control the engine to be in the shutdown state if the starting state is the state corresponding to starting based on the 12V starting mode, and the revolution speed information, the start duration information, the coolant temperature information and the torque information meet the first sub-condition.

13. The device for controlling engine to shut down according to claim 11, wherein the processor is configured to control the engine to be in the shutdown state if the starting state is the state corresponding to starting based on the first motor starting mode, and the revolution speed information, the start duration information, the coolant temperature information and the torque information meet the second sub-condition.

14. The device for controlling engine to shut down according to claim 11, wherein the processor is configured to control the engine to be in the shutdown state if the starting state is the state corresponding to starting based on the clutch starting mode, and the revolution speed information, the start duration information, the coolant temperature information and the torque information meet the third sub-condition.

\* \* \* \* \*